United States Patent
Greiff et al.

(10) Patent No.: US 8,633,373 B2
(45) Date of Patent: Jan. 21, 2014

(54) SUB-MICROMETER GAP THERMOPHOTOVOLTAIC STRUCTURE (MTPV) AND FABRICATION METHOD THEREFOR

(75) Inventors: Paul Greiff, Wayland, MA (US); Robert DiMatteo, Belmont, MA (US); Eric Brown, Cambridge, MA (US); Christopher Leitz, Watertown, MA (US)

(73) Assignee: MTPV Power Corporation, Austin, TX (US)

( * ) Notice: Subject to any disclaimer, the term of this patent is extended or adjusted under 35 U.S.C. 154(b) by 998 days.

(21) Appl. No.: 12/152,195

(22) Filed: May 12, 2008

(65) Prior Publication Data

US 2010/0319749 A1 Dec. 23, 2010

(51) Int. Cl.
*H01L 31/058* (2006.01)

(52) U.S. Cl.
USPC ............... 136/253; 136/244; 438/57; 438/80

(58) Field of Classification Search
USPC .............................. 136/253, 244; 438/57, 80
See application file for complete search history.

(56) References Cited

U.S. PATENT DOCUMENTS

| | | | | |
|---|---|---|---|---|
| 4,743,302 A | * | 5/1988 | Dumesnil et al. | 106/1.23 |
| 5,401,329 A | * | 3/1995 | Fraas et al. | 136/253 |
| 5,611,870 A | * | 3/1997 | Horne et al. | 136/253 |
| 6,232,546 B1 | * | 5/2001 | DiMatteo et al. | 136/253 |
| 6,423,896 B1 | * | 7/2002 | Keegan | 136/253 |
| 2004/0231717 A1 | * | 11/2004 | Greiff et al. | 136/253 |
| 2006/0016471 A1 | * | 1/2006 | Greiff | 136/253 |
| 2007/0137696 A1 | * | 6/2007 | Krokoszinski et al. | 136/255 |

* cited by examiner

*Primary Examiner* — Golam Mowla
(74) *Attorney, Agent, or Firm* — Taylor Russell & Russell, P.C.

(57) ABSTRACT

An MTPV thermophotovoltaic chip comprising a photovoltaic cell substrate, micron/sub-micron gap-spaced from a juxtaposed heat or infrared radiation-emitting substrate, with a radiation-transparent intermediate window substrate preferably compliantly adhered to the photovoltaic cell substrate and bounding the gap space therewith.

26 Claims, 5 Drawing Sheets

SUB-MICROMETER GAP THERMOPHOTOVOLTAIC STRUCTURE (MTPV) AND FABRICATION METHOD THEREFOR

FIELD OF INVENTION

The present invention relates to sub-micrometer gap thermophotovoltaic devices (MTPV) for generating electrical power, wherein a heat or infrared source or emitter is spaced from a photovoltaic cell surface by a gap preferably of less than one micrometer (hereinafter sometimes referred to as micron/sub-micron gaps), obviating the far-field limitation of Planck's Law and allowing the system to function as though its black body emissivity were greater than unity and thereby achieving photocurrents many times those obtained in conventional far-field thermophotovoltaic cells (TPV), as described in U.S. Pat. Nos. 6,084,173 and 6,232,546, and the paper entitled "Micron-gap ThermoPhoto Voltaic (MTPV)", DiMatteo et al., Proceedings of the Fifth TPV Conference, 2002, all incorporated herein by reference; the invention being more particularly concerned with the novel interposition of an infrared-transmitting window in the gap adjacent the photovoltaic cell, and improvements resulting therefrom in cell structure and in the fabrication or manufacture of such structures.

BACKGROUND OF INVENTION

To avoid thermal shorting, the MTPV system is preferably operated in a vacuum enclosure or housing H which enables an evacuated gap G; and gap spacers—made, for example, of silicon dioxide—are employed to set the gap between the emitter and the photovoltaic cell receiver in a manner which minimizes heat transfer through the spacers. Phonons or non-radiated energy carriers are a source of inefficiency though they transfer energy from the source; but they do not have the individual energy to excite electrons across the bandgap.

As described in the above referenced paper, a previous method of forming the spacers between the heat emitter and the photovoltaic cell substrate was to grow a thick oxide on the emitter chip and pattern the oxide through such methods as photolithography and plasma etching into cylindrical spacers, with the spacers to be about six microns in diameter; but a disadvantage of this technique is that the spacers permit too large a heat loss from the emitter, reducing the efficiency of conversion of heat to electricity and increasing the cooling requirements on the photovoltaic cell.

Another disadvantage arises in the use of micrometer gap thermophotovoltaic devices of large area, requiring, for example, brazing individual chips to create a "tiled" surface as, for example, in U.S. Pat. No. 6,232,546. A single large emitter chip and photovoltaic cell cannot be used because the emitter is operated at about 1000° C. and the photovoltaic cell must be kept at room temperature to function effectively as a collector of photons and a generator of electrons. The difference in thermal expansion between the heater and the photovoltaic cell as the heater chip is heated from room temperature to of the order of 1000° C., can break the spacers or distort the geometry during the temperature excursion if there is such a rigid attachment.

An approach to solve this problem is to use an array of laterally spaced hollow tubes of thermally resistant material disposed in wells formed in the heat emitter substrate, each carrying a flange on top and serving as a spacer extending into the gap—as indicated at S in the drawings—a structure that lends itself to fabrication by established microfabrication methods such as lithography and plasma etching, particularly with a silicon emitter substrate and silicon dioxide spacers.

A more facile and less complicated and less costly construction is now, however, provided by the present invention, as later described in detail.

OBJECTS OF THE INVENTION

It is accordingly an object of the present invention to provide a new and improved micron/submicron gap thermophotovoltaic device and method of manufacturer and assembly, with a lower fabrication cost, and for precise and uniform setting of the gap dimension, and that shall not be subject to the above-described and other limitations of the prior art.

Another object of the present invention is to provide a new and improved thermophotovoltaic device of the character described using a sub-micron gap, preferably evacuated, with an integrated intermediate radiation transparent window preferably compliantly adhered to the photovoltaic device and bounding the gap formed therewith.

Other and further objects are described hereinafter and are pointed out in the appended claims.

SUMMARY OF THE INVENTION

In summary, the invention embraces a sub-micrometer gap thermo-photovoltaic chip structure comprising a photovoltaic cell substrate, micron/sub-micron gap-spaced from a juxtaposed heat or infrared radiation-emitting substrate, with a radiation-transparent intermediate window substrate preferably compliantly adhered to the photovoltaic cell substrate and bounding the gap space therewith.

Preferred and best mode embodiments are hereinafter presented in detail.

BRIEF DESCRIPTION OF THE DRAWINGS

The invention will now be described in connection with the accompanying drawings, in which.

DESCRIPTION OF PREFERRED EMBODIMENT(S)

Figure 1:
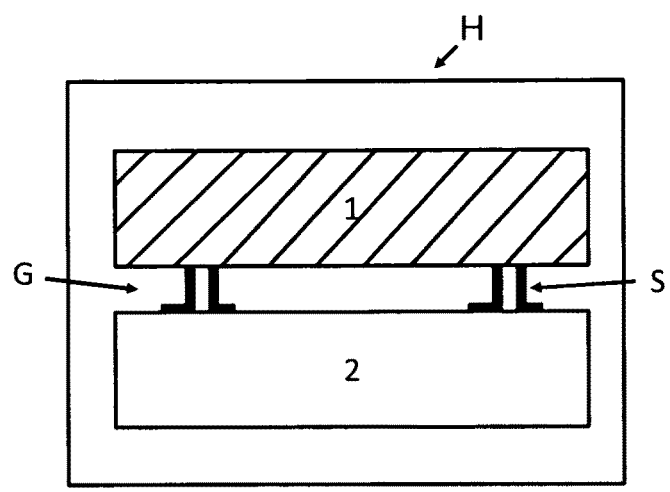
FIG. 1 is an enlarged schematic view of a prior art sub-micron gap thermo-photovoltaic device.

Referring to the drawings, a sub-micrometer gap thermo-photovoltaic device is shown on an enlarged and exploded fragmentary schematic view, including a photovoltaic cell layer or substrate 2, a juxtaposed heat or infrared source emitter chip 1, at least one and preferably an array of spacers S located between the emitter chip 1 and PV cell 2, and a gap of sub-micrometer separation labeled G maintained by the spacers. The spacers may be disposed upon either the emitter chip 1 ("hot side" spacers) or PV cell 2 ("cold side" spacers).

While conventional TPV systems involve conversion of infrared light emitted by a blackbody into electricity via the use of photovoltaic (PV) cells, MTPV systems utilize a preferably sub-micron evacuated gap between the ("hot side") emitter and the PV cell ("cold side") to achieve enhanced radiative transfer as compared to conventional far-field TPV systems, as earlier mentioned.

There are, however, several challenges in the manufacturing of a MTPV systems capable of generating commercially significant (>1 kW) power levels. First, one must achieve a very small and preferably uniform gap G between the emitter 1 and the PV cell 2. Second, this operation must be repeated many times to achieve an integrated MTPV system capable of achieving high power levels; the exact number of times depending upon the power level specified, the size of each PV cell 2 and emitter chip 1, and the power density and efficiency of the system. Finally, in some embodiments, the formation of the submicron gap G between the emitter 1 and the PV cell 2 may occur after these components are fully processed, therefore requiring accommodating during assembly of the resulting bow and surface irregularities.

Figure 2:
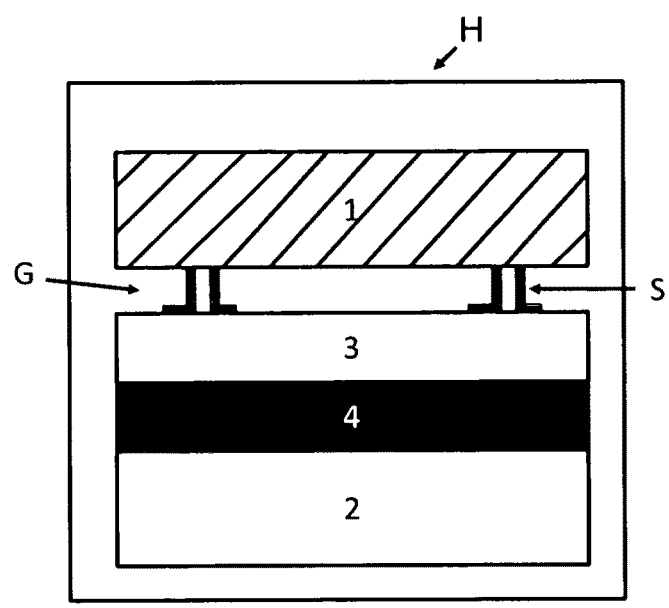
FIG. 2 is a similar view of the invention in preferred form.

The present invention, illustrated in FIG. 2, admirably solves these problems by utilizing an intermediate "window" material 3 between the PV cell 2 and the emitter 1, where the sub-micron gap G is formed between the emitter 1 and the window 3. The PV cell 2 or array or plurality of cells is shown integrated onto the back or outside surface of the window 3, as by a preferably somewhat compliant adhesive layer.

The window material 3 should be transparent to the radiation emitted by the emitter chip 1. In general, this requires a material with a band gap larger than the infrared (greater than approximately 1.0 electron-Volt) and a low density of free carriers or defects. The window material layer 3 should also have a high refractive index, preferably equal to or larger than the refractive index of the emitter and PV cell. Window materials for the invention include single crystalline semi-insulating GaAs, single crystalline semi-insulating InP, float-zone Si, or lightly doped Si.

The adhesive layer 4, moreover, must be able to bond the PV cell 2 to the window material 3 without voids, cracking or delaminating. In theory, adhesive layers with a coefficient of thermal expansion matched to the PV cell and window are ideal; but, in reality, this is difficult to achieve given the inherent trade-off between melting point and coefficient of thermal expansion—adhesives must melt at low temperature, so they will generally exhibit high coefficients of thermal expansion, since melting point and thermal expansion are both fundamentally a function of atomic bond strength. Alternately, the bond can be engineered to minimize the total thermal mismatch energy between the adhesive, PV cell, and window, by well-known methods such as low temperature or anodic bonding.

The adhesive layer 4 should also preferably exhibit a high refractive index (>1.4 and preferably >2) and high transmission in the infrared. Suitable adhesive layers 4, for the purpose of present invention include epoxies, filled elastomers, solder glasses such as those containing lead oxide, and chalcogenide glasses. Chalcogenide glasses are amorphous solid materials, composed of such elements as germanium, selenium, tellurium, arsenic, indium, sulfur, and antimony. They are preferable because of their high refractive indices, high infrared transmission, and low softening points. The adhesive material of layer 4 preferably also exhibits some compliancy, as before stated.

Figure 3:
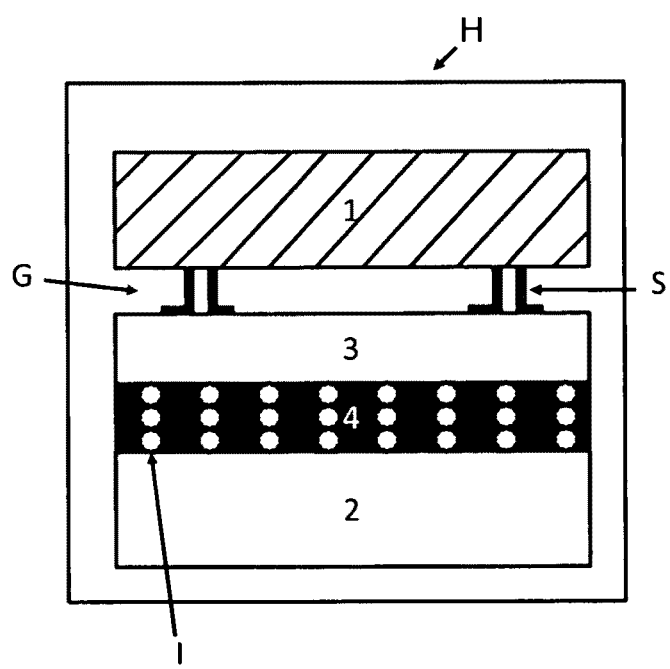
FIG. 3 is a view of the invention incorporating additional functionality imparted by up-conversion layers.

In some embodiments of the invention, additionally, the adhesive material may serve a dual function, both as the previously described adhesive to adhere or hold the PV cell to the window material, and also as a material to provide for up-conversion of incoming photons. Up-conversion involves the use of low energy photons to promote electrons in a material up one or more energy levels. When the electron relaxes to a lower energy state, it emits a photon of a higher energy. These up-conversion layers may be used to tailor the incoming infrared light spectrum to the PV cell. Typically, they are formed via introduction of rare earth compounds or ions, based on such elements as yttrium or erbium, into the adhesive material layer 4. Alternately, up-conversion can be achieved through incorporation of semiconductor quantum dots into the adhesive material layer 4. In this embodiment of FIG. 2, the up-conversion functionality is incorporated into the adhesive material layer 4, as schematically represented at D in FIG. 3.

Figure 4A:
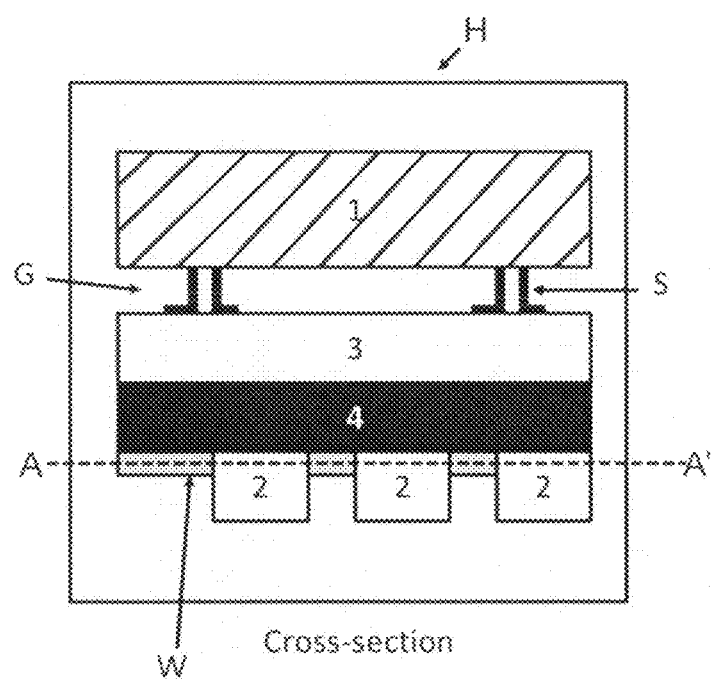
FIGS. 4(a) and 4(b) present a view of the invention additionally incorporating wiring and bypass diodes.
Figure 4B:
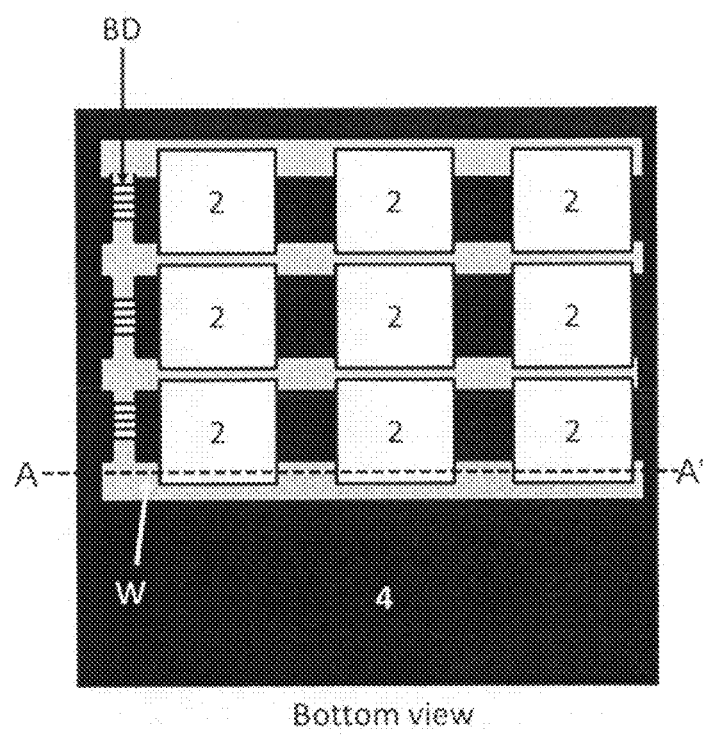

Among the advantages of this modified MPTV structure of the invention are that the window material of layer 3 can be a single-crystal wafer that has very good surface roughness and overall flatness, enabling formation of a uniform gap G over a large area. Secondly, though many different PV cells may then be integrated onto the window, they will all be subject to the same uniform gap G formed between the emitter layer 1 and the window layer 3. Third, the adhesive layer 4 can provide an insulating base that enables integration of wiring and bypass diodes into the MPTV package. Such an arrangement is schematically shown in FIGS. 4(a) and 4(b). In these figures, the line A-A' is used to demonstrate the correspondence between cross-sectional view of FIG. 4(a) and the bottom view of FIG. 4(b). The wires, schematically indicated as W, and bypass diodes, indicated as BD, utilize the insulating adhesive layer 4 as a substrate. Finally, PV cells layer 2 with non-uniform surfaces can be accommodated by the adhesive material, as its compliancy assures that the entire PV cell can be adhered or "stuck" to the window even if its surface is irregular.

The use of such a window construction, moreover, also readily allows the formation of gap spacers on the either the "hot" side or the "cold" side. In the prior art as shown in FIG. 1, the use of "cold" side spacers requires that the spacers are formed on the PV cell. In this embodiment, if the PV cell is a smaller area than the emitter, then the achievement of a uniform gap requires that identically sized spacers are formed on individual PV cells and the cells are placed proximate to the emitter with a substantially uniform gap between the emitter and each PV cell. In practice, this is difficult to achieve given process non-uniformities and variability in mechanical loading of each PV cell within the housing. In the current invention, as shown in FIG. 4, if "cold" side spacers are utilized, they are formed on a single window layer instead of on multiple individual PV cells. This completely opens up the type of material that can be used for the emitter layer 1. For example, a selective emitting substance such as tungsten silicide can be deposited on a refractory substrate such as zirconia.

The technique of the invention is applicable to both front and rear illuminated PV devices, although the requirements on the window material may be very different for the two cases.

Further modifications will also occur to those skilled in this art, and such are considered to fall within the spirit and scope of the invention as defined in the appended claims.

What is claimed is:

1. A sub-micron gap thermophotovoltaic structure for generating electrical power, comprising:
    an infrared radiation-emitting substrate having an external surface for receiving energy from a heat source and an opposing infrared radiation-emitting internal surface juxtaposed from a first surface of a radiation-transparent window substrate by a sub-micron gap;
    a radiation-transparent window substrate second surface opposing the radiation-transparent window substrate first surface, the radiation-transparent window substrate second surface affixed to a surface of a photovoltaic cell substrate by an adhesion layer having a capability of up-conversion of low-energy photons and high transmissivity in at infrared frequencies;

the radiation-transparent window substrate having a refractive-index that is equal to or greater than the refractive index of the infrared radiation-emitting substrate and the photovoltaic cell substrate as a means for improved collection and transmission of infrared energy from the infrared radiation-emitting internal surface of the infrared radiation-emitting substrate to the photovoltaic cell substrate; and the radiation-transparent window substrate being transparent to the radiation emitted by the infrared radiation-emitting substrate and selected from the group of materials consisting of single crystalline semi-insulating GaAs, single crystalline semi-insulating InP, float-zone Si, and lightly doped Si.

2. The structure of claim 1 wherein said structure is enclosed in an evacuated housing.

3. The structure of claim 1 wherein the adhesive layer attaches the radiation-transparent window substrate second surface outside the gap space to the photovoltaic cell.

4. The structure of claim 3 wherein the radiation-transparent window substrate is transparent to radiation emitted by the infrared radiation-emitting substrate, requiring a band gap larger than the infrared, greater than about 1.0 electron-volt and a low density of free carriers or defects.

5. The structure of claim 3 wherein the adhesive layer is free of voids, cracks or delamination.

6. The structure of claim 3 wherein the radiation-transparent window substrate exhibits a refractive index equal to or larger than that of the infrared radiation-emitting and photovoltaic cell substrates.

7. The structure of claim 6 where the refractive index of the adhesive layer is greater than 1.4 and is highly transmitting at infrared frequencies.

8. The structure of claim 3 wherein a material of the radiation-transparent window substrate is selected from the group consisting of single crystalline semi-insulating GaAs, single crystalline semi-insulating InP, float-zone Si, or lightly doped Si.

9. The structure of claim 7 wherein the adhesive layer exhibits compliancy.

10. The structure of claim 7 wherein a material of the adhesive layer is selected from the group consisting of epoxies, filled elastomers, and solder glasses including those containing lead oxide, and chalcogenide glasses.

11. The structure of claim 7 wherein the adhesive layer serves a further function of enabling up-conversion of incoming photons.

12. The structure of claim 11 wherein material introduced into the adhesive layer to enable up-conversion is selected from the group consisting of rare earth ions based on yttrium and erbium elements, compounds based on yttrium and erbium elements and semiconductor quantum dots.

13. The structure of claim 7 wherein a plurality of photovoltaic cells are attached to a common radiation-transparent window substrate.

14. The structure of claim 1 wherein the affixed to a surface of a photovoltaic cell substrate is effected with an adhesive layer attaching the radiation-transparent window substrate second surface outside the gap to the photovoltaic cell substrate, a means of adjusting uniformity of the gap comprising a means for attaching a common radiation-transparent window substrate to a plurality of photovoltaic cell substrates by an interposed compliant adhesive layer, and a means for adjusting the compliant adhesive layer uniformly over the radiation-transparent window substrate second surface.

15. The structure of claim 14 wherein the adhesive layer is made free of voids, cracks and delaminations.

16. The structure of claim 14 wherein a refractive index of the adhesive layer is greater than 1.4 and is highly transmitting at infrared frequencies.

17. The structure of claim 14 wherein a material of the adhesive layer is selected from the group consisting of epoxies, filled elastomers, and solder glasses including those containing lead oxide, and chalcogenide glasses.

18. The structure of claim 1, further comprising an array of spacers located between the infrared radiation-emitting substrate internal surface and the first surface of the radiation-transparent window substrate for maintaining the sub-micron gap, the array of spacers being formed on the first surface of the radiation-transparent window substrate.

19. An MTPV thermophotovoltaic chip for generating electrical power, comprising:

a radiation-transparent window substrate having a second surface affixed to a surface of a photovoltaic cell substrate by a high-transmissivity adhesive layer with up-conversion capability for low energy photons;

a first surface opposite the second surface of the radiation-transparent window substrate, the first surface of the radiation-transparent window substrate juxtaposed from an infrared radiation-emitting internal surface of an infrared radiation-emitting substrate by a sub-micron gap; and the radiation-transparent window substrate having a high index of refraction for improved collection and transmission of infrared energy from the infrared radiation-emitting internal surface of the infrared radiation-emitting substrate, wherein material for the radiation-transparent window substrate is transparent to the radiation emitted by the infrared radiation-emitting substrate and is selected from the group consisting of single crystalline semi-insulating GaAs, single crystalline semi-insulating InP, float-zone Si, and lightly doped Si.

20. The MTPV thermophotovoltaic chip of claim 19, wherein the high-transmissivity adhesive layer provides the up-conversion of incoming photons from the radiation-transparent window substrate to the photovoltaic cell.

21. The MTPV thermophotovoltaic chip of claim 19, wherein material included in the adhesive layer to enable up-conversion of photons is selected from the group consisting of rare earth ions based on yttrium and erbium elements, rare earth compounds based on yttrium and erbium elements and semiconductor quantum dots.

22. The MTPV thermophotovoltaic chip of claim 19, wherein the sub-micron gap is evacuated.

23. The MTPV thermophotovoltaic chip of claim 19, wherein the radiation-transparent window substrate is a single-crystal wafer with overall flatness for maintaining a uniform gap over a large area.

24. The MTPV thermophotovoltaic chip of claim 23, wherein a single radiation-transparent window substrate provides a uniform gap for a plurality of photovoltaic cells.

25. The MTPV thermophotovoltaic chip of claim 19, wherein the adhesive layer provides an insulating base for integrating wires and bypass diodes into the MTPV thermophotovoltaic chip.

26. The MTPV thermophotovoltaic chip of claim 19, wherein the adhesive layer is compliant for maintaining a uniform gap when affixed to one or more photovoltaic cells having irregular surfaces.

* * * * *